(12) United States Patent
Shakhov

(10) Patent No.: US 10,165,014 B2
(45) Date of Patent: Dec. 25, 2018

(54) METHODS, SYSTEMS, AND COMPUTER READABLE MEDIA FOR A DISTRIBUTED COMPONENT MODEL ARCHITECTURE (DCMA) IN A SESSION OVER INTERNET PROTOCOL (SOIP) NETWORK

(76) Inventor: Roman Shakhov, Fairfax, VA (US)

( * ) Notice: Subject to any disclaimer, the term of this patent is extended or adjusted under 35 U.S.C. 154(b) by 1856 days.

(21) Appl. No.: 12/748,327

(22) Filed: Mar. 26, 2010
(Under 37 CFR 1.47)

(65) Prior Publication Data
US 2017/0013025 A1 Jan. 12, 2017

Related U.S. Application Data

(60) Provisional application No. 61/165,845, filed on Apr. 1, 2009.

(51) Int. Cl.
| | |
|---|---|
| *H04L 29/06* | (2006.01) |
| *H04L 12/721* | (2013.01) |
| *H04M 7/00* | (2006.01) |

(52) U.S. Cl.
CPC .......... *H04L 65/1046* (2013.01); *H04L 45/70* (2013.01); *H04L 65/1033* (2013.01); *H04M 7/0081* (2013.01)

(58) Field of Classification Search
CPC ............... H04L 12/66; H04L 29/12094; H04L 29/1216; H04L 66/1046; H04L 66/1033; H04L 45/70
See application file for complete search history.

(56) References Cited

U.S. PATENT DOCUMENTS

| | | | | |
|---|---|---|---|---|
| 7,046,658 B1* | 5/2006 | Kundaje | ............... | H04M 15/56 370/352 |
| 2004/0022267 A1* | 2/2004 | Birru | ............... | H04B 1/38 370/468 |
| 2005/0063318 A1* | 3/2005 | Xu | ............... | H04L 45/02 370/254 |
| 2005/0185646 A1* | 8/2005 | Karino | ............... | H04L 45/00 370/389 |
| 2006/0182118 A1* | 8/2006 | Lam | ............... | H04L 12/4641 370/395.42 |
| 2007/0047706 A1* | 3/2007 | Starling | ............... | H04M 15/00 379/114.03 |

(Continued)

*Primary Examiner* — Walter J Divito
*Assistant Examiner* — Anthony Luo
(74) *Attorney, Agent, or Firm* — Fogarty LLP

(57) ABSTRACT

Methods, systems, and computer readable media for distributed component model architecture (DCMA) in a session over Internet protocol (SoIP) network is disclosed. According to one system, the system includes at least one session routing engine (SRE) for routing calls in an SoIP network. The system also includes at least one session border controller (SBC) for receiving, from a message source, a first message associated with a call in a SoIP network. The SBC is further configured for identifying a call source, wherein the call source is information, other than a calling party identifier, that identifies a source of the first message. The SBC is also configured for selecting one of the at least one SRE and sending to the selected SRE information associated with the message, the information including the call source. The SRE routes messages associated with the call according to a calling plan associated with the identified call source.

37 Claims, 9 Drawing Sheets

(56) References Cited

U.S. PATENT DOCUMENTS

| | | | |
|---|---|---|---|
| 2007/0165532 A1* | 7/2007 | Retana | H04L 45/18 370/241 |
| 2007/0293268 A1* | 12/2007 | Isobe | H04N 7/17318 455/560 |
| 2008/0084975 A1* | 4/2008 | Schwartz | H04M 3/436 379/88.22 |
| 2008/0188231 A1* | 8/2008 | Zhu | H04W 72/1252 455/450 |
| 2008/0259920 A1* | 10/2008 | Cheng | H04L 12/437 370/390 |
| 2009/0055835 A1* | 2/2009 | Zhu | H04L 41/0896 718/105 |
| 2010/0130170 A1* | 5/2010 | Liu | H04W 36/0022 455/411 |
| 2010/0150145 A1* | 6/2010 | Ku | H04L 12/66 370/356 |

* cited by examiner

METHODS, SYSTEMS, AND COMPUTER READABLE MEDIA FOR A DISTRIBUTED COMPONENT MODEL ARCHITECTURE (DCMA) IN A SESSION OVER INTERNET PROTOCOL (SOIP) NETWORK

PRIORITY CLAIM

This application claims the benefit of U.S. Provisional Patent Application No. 61/165,845, filed on Apr. 1, 2009, the disclosure of which is incorporated herein by reference in its entirety.

TECHNICAL FIELD

The subject matter described herein relates to session over internet protocol (SoIP) networks. More specifically, the subject matter relates to methods, systems, and computer readable media for a distributed component model architecture (DCMA) in a SoIP network.

BACKGROUND

Voice telecommunication has traditionally been conducted via dedicated telephone networks using telephone switching offices and either wired or wireless connections for transmitting the voice signal between users' telephones. Such telecommunications, which use the public switched telephone network (PSTN), may be referred to as circuit-switched communications. Because of the circuit-based nature of the PSTN, each call within the PSTN requires a dedicated point-to-point circuit throughout its duration, resulting in inefficient use of network bandwidth since many conversations include significant intervals of silence.

Session over Internet protocol (SoIP) provides an alternative telecommunication architecture using discrete Internet-protocol (IP) packets of digitized data to transmit media content over the Internet or within an intranet via wired and/or wireless connections. One type of SoIP technology, voice over Internet Protocol (VoIP), provides an alternative to the PSTN for voice communications. SoIP technology can transmit other forms of multimedia communication such as video voice content, video content and/or data. Because SoIP does not require a dedicated circuit between endpoints throughout a session (e.g., a voice call). SoIP technology makes more efficient use of network bandwidth.

A session controller (SC) facilitates the flow of two-way SoIP traffic between different parts of a network or between different networks. A SC and/or its related functionality may be part of a SoIP network. When a SC is located at the border of a network (e.g., where the SoIP network connects with another network, such as a private enterprise network), the SC is typically called a session border controller (SBC). As used herein. SC and SBC will be used interchangeably.

Conventional SC or SBC deployments consist of a single, independent SBC cluster in a network. A conventional SBC cluster may include one or more SBCs for facilitating the flow of two-way SoIP traffic between different parts of a network or between different networks. Conventional SBCs perform routing of signaling and media streams for SoIP traffic. One weakness of this approach is that a denial of service (DoS) attack at a node in the cluster or malformed packets received for routing by one SBC in the cluster may cause its routing element to fail, thus disabling the node. Furthermore, if a backup node comes online and attempts to process the same or different malformed traffic the same results are likely to occur. This may occur until the whole cluster has failed. Once a cluster has crashed in a conventional cluster deployment, all customers serviced by that cluster are unable to send or receive traffic. Hence, conventional SBC deployments have poor network resiliency.

Another shortcoming of conventional SBC deployments is difficulty of scalability. In such deployments, adding new clusters requires extensive provisioning and additional routing plans for inter-cluster traffic (i.e., traffic between clusters) increasing cost and complexity. For example, if a network operator wants to increase traffic capacity of a SoIP network with a conventional SBC deployment, the network operator may buy another SBC cluster and provision it separately from other clusters the network operator may own. Adding a new cluster requires redistributing some customers of the network operator (i.e., SoIP devices of the customers) to the new cluster. Additionally, adding a new cluster requires providing routing information including calling plans and bindings for the new cluster. Conventional SBCs traditionally have capabilities to store only a limited number of routes. Furthermore, a new cluster in a conventional deployment requires the network operator to provision additional routes for inter-cluster traffic on every cluster so that every customer of the network operator may communicate with each other. Therefore, each SBC cluster in the expanded conventional deployment may have less space for out-of-network routes. Thus, independent cluster deployments can result in inefficient management and usage of resources and may increase complexity and cost of an SBC deployment.

Accordingly, in light of these shortcomings, a need exists for methods, systems, and computer readable media for a distributed component model architecture (DCMA) system in a SoIP network that provides for increased performance, scalability, and resiliency.

SUMMARY

Methods, systems, and computer readable media for distributed component model architecture (DCMA) in a session over Internet protocol (SoIP) network is disclosed. According to one system, the system includes at least one session routing engine (SRE) for routing calls in a SoIP network. The system also includes at least one session border controller (SBC) for receiving, from a message source, a first message associated with a call in a SoIP network. The SBC is further configured for identifying a call source, wherein the call source is information, other than a calling party identifier, that identifies a source of the first message. The SBC is also configured for selecting one of the at least one SRE and sending to the selected SRE information associated with the message, the information including the call source. The SRE routes messages associated with the call according to a calling plan associated with the identified call source.

A method for routing calls in a DCMA system is also disclosed. The method occurs at an ingress session border controller (SBC) in a DCMA system that includes at least one session routing engine (SRE) for routing messages in the DCMA system. The method includes receiving, from a message source, a first message associated with a call. The method further includes identifying a call source, wherein the call source is information, other than a calling party identifier, that identifies a source of the first message. The method also includes selecting one of the at least one SRE and sending a second message to the selected SRE for routing. The second message includes the call source information.

The subject matter described herein for DCMA in a SoIP network may be implemented using a computer readable medium having stored thereon executable instructions that are executed by a computer processor. Exemplary computer readable media suitable for implementing the subject matter described herein includes disk memory devices, programmable logic devices, and application specific integrated circuits. In one implementation, the computer readable medium may include a memory accessible by a processor. The memory may include instructions executable by the processor for implementing any of the methods for a distributed component model architecture (DCMA) in a SoIP network described herein. In addition, a computer readable medium that implements the subject matter described herein may be distributed across multiple physical devices and/or computing platforms.

BRIEF DESCRIPTION OF THE DRAWINGS

The subject matter described herein will now be explained with reference to the accompanying drawings of which.

DETAILED DESCRIPTION

Figure 1:
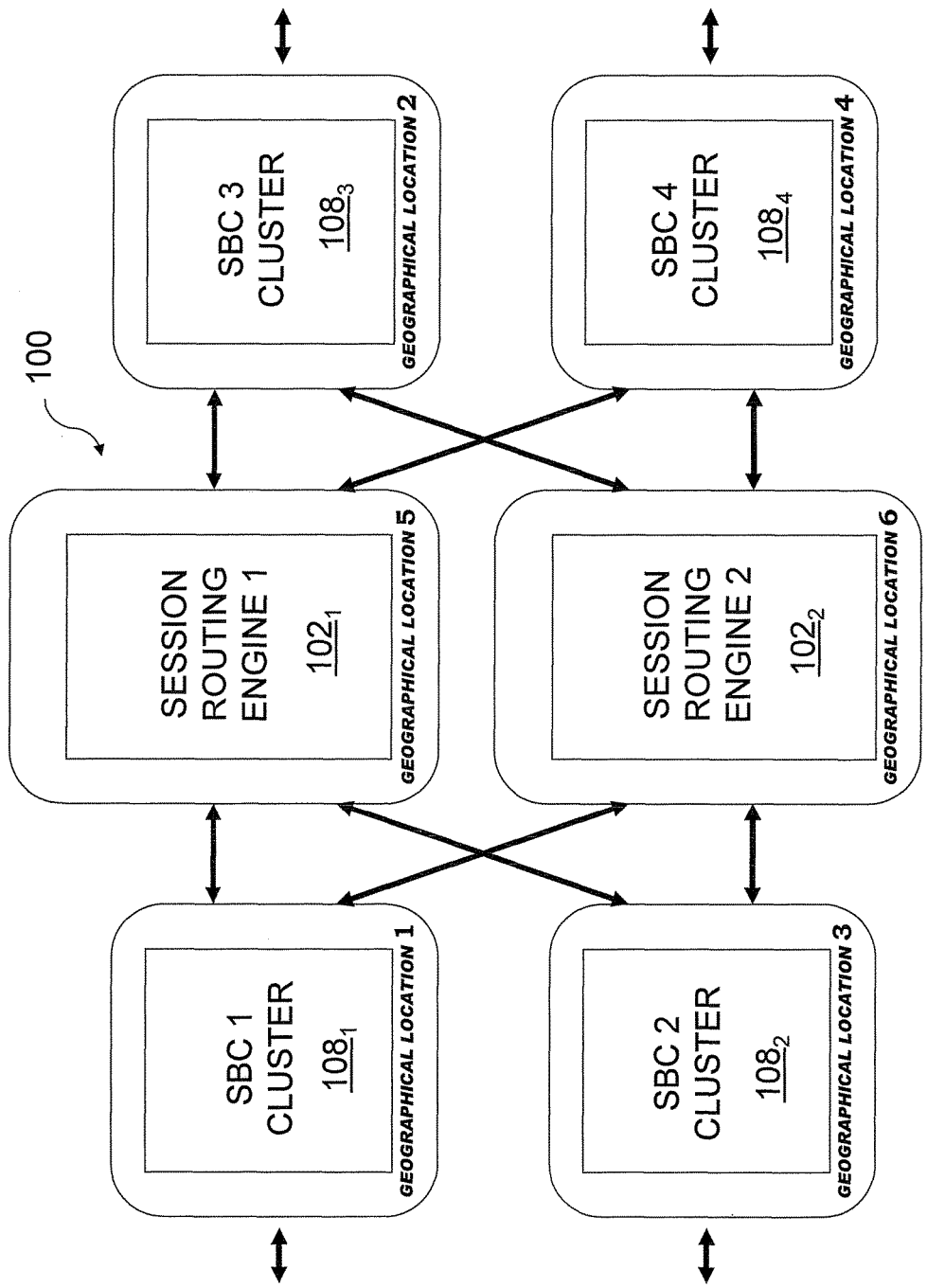
FIG. 1 depicts a block diagram of a distributed component model architecture (DCMA) system according to an embodiment of the subject matter described herein.

FIG. 1 depicts a block diagram a DCMA system 100 according to an embodiment of the present subject matter. DCMA is a type of architecture for SBC deployments allowing a plurality of SBC clusters to connect to one or more session routing engines (SREs). In the embodiment shown in FIG. 1, DCMA system 100 includes a plurality of SBC clusters 108 for connecting DCMA system 100 to one or more external networks (not shown), and a plurality of SREs 102 for routing calls through the DCMA system 100. It will be appreciated that DCMA system 100 may also include other components not depicted. For example, DCMA system 100 may include a real-time session manager (RSM) or some other device for monitoring and updating DCMA system 100. A RSM may also provide functionality for analyzing sessions or session detail records (SDRs) and for calculating performance metrics of sessions for improving efficiency of DCMA system 100. It will be appreciated that while a plurality of SBC clusters 108 and SREs 102 are depicted in FIG. 1, DCMA system 100 may include a single SBC and a single SRE. Further, it will be appreciated that the exact number of SREs 102 and SBC clusters 108 may depend on the deployment criteria and other requirements. Further, some features, such as resiliency, of DCMA system 100 may be enhanced with additional components. For example, resiliency may be enhanced by adding an SRE 102 to DCMA system 100. In one embodiment, SBC clusters 108 can be geographically distributed. Likewise. SREs 102 can also be geographically distributed.

In the embodiment shown in FIG. 1, each SBC cluster $108_{1-4}$ and each SRE $102_{1-2}$ is located in a different geographical location. SBC clusters 108 may facilitate the flow of two-way SoIP traffic between different parts of a network or between different networks. It will be appreciated SBC clusters 108 in a DCMA system 100 may include related functionality such as flexible media routing policies, mirror proxy functionality, outbound proxy functionality, and the like.

As used herein, the term "SoIP device" refers to any SoIP (e.g., VoIP) device which signals using SIP. H.323, or other signaling protocols, including a SIP user agent client, a SIP user agent server, a SIP proxy server, a SIP gateway, an H.323 gateway, or an H.323 master gatekeeper. A SBC cluster 108 may act as an intermediary between SoIP devices and SREs. In one embodiment, SBC clusters 108 may receive calls (e.g., messages associated with calls or call attempts in the network) and send these messages to an SRE 102 for determining routing decisions for interconnecting networks.

In one embodiment. SBC clusters 108 may perform call admission control (CAC). CAC is used to prevent congestion or oversubscription in SoIP networks and typically works by rejecting calls when some threshold or limit has been reached (e.g., a peak amount of simultaneous calls from a specific network operator). In one embodiment. SBC clusters 108 may perform CAC for incoming calls from SoIP devices. CAC parameters for incoming calls may be based on service agreements between network operators and/or other criteria. In one embodiment. CAC parameters may be configured for traffic sent between SBC clusters 108 and SRE 102 if special traffic distribution thresholds between SREs 102 are required. CAC may also be used to reject unauthorized calls.

Some advantages of DCMA system 100 include scalability and network resilience. One way that DCMA system 100 achieves scalability is by allowing routing decisions for calls received by SBC clusters 108 to be made by SREs 102. DCMA system 100 allows routing information, such as calling plans, routes, and bindings to be maintained at the SREs 102 instead of at the SBC, thus freeing the SBC from this computational burden, which may increase the performance of the SBC.

In one embodiment, each SRE 102 may be substantially identically provisioned except for system configuration and layer 3 related IP configuration of the particular SRE (e.g., each SRE 102 may have one or more unique IP addresses for connecting to other components). In one embodiment, each SRE 102 may contain identical provisioning and/or routing databases that include information for routing SoIP devices provisioned at SBC clusters 108 such as routes, calling plans, and bindings. In this embodiment, one SRE 102 may maintain a provisioning and/or routing database that is replicated on every other SRE 102.

Additionally, the complexity of configuring a new SBC cluster 108 is reduced. A new SBC cluster 108 in DCMA system 100 may only need to know the addresses of nodes (e.g., SoIP devices) that communicate with or will communicate with the new cluster and the addresses of the SREs 102 in DCMA system 100. Each new SBC cluster 108 may not need to know the address of all other SBCs 108 because routing may be performed by SRE 102.

These features reduce complexity and cost by not requiring the SBCs to maintain routing information and by allowing SREs 102 and SBC clusters 108 to be configured quickly. Further, since SREs 102 may handle all signaling traffic in a SoIP network, SRE 102 is a convenient place for billing, session detail reporting, and lawful interception functionality thereby reducing a need for a separate reporting or recording element in DCMA system 100.

DCMA system 100 also provides network resilience. In addition to allowing a plurality of SBC clusters 108 in a SBC deployment, DCMA system 100 allows one or more SREs 102 to handle routing for the plurality of SBC clusters 108. An SBC cluster 108 may determine which SRE 102 routes a given call based on network conditions or other criteria including availability, configurations, and service agreements. In one embodiment, routing in a DCMA system 100 may be performed independently by a minimum of two SREs 102. In this embodiment, each SRE 102 in DCMA system 100 may contain all routing information about provisioned SBC clusters 108. As such, routing may be performed if at least one SRE 102 is available. Thus, DCMA system 100 allows routing to continue if at least one SRE 102 is available.

Additionally, SBC clusters 108 may act as a first line of defense for SRE 102. In one embodiment, SRE 102 accepts traffic for routing only from SBC clusters 108, which will send only properly formed packets to SRE 102, and not from nodes other than SBC clusters 108, which might send incorrectly formed or mal-formed packets to SRE 102. In this manner, SBC clusters 108 may act as a protection mechanism and packet filter for SRE 102. In one embodiment, SBC clusters 108 may detect attacks or malformed packets and prevent such traffic from reaching SRE 102. In one embodiment, preventing such traffic may include normalizing traffic. For example, SBC clusters 108 may rewrite received signaling messages so as to include only portions from received signaling messages that are appropriate and usable by SRE 102 (i.e., properly formed). In case of malformed packets, attacks, or other possible factors leading to the failure or malfunction of one SBC or SBC cluster, DCMA system 100 allows other SBC clusters 108 to continue sending calls for routing. Additional resiliency features of DCMA system 100 will be discussed in further detail below.

Figure 2:
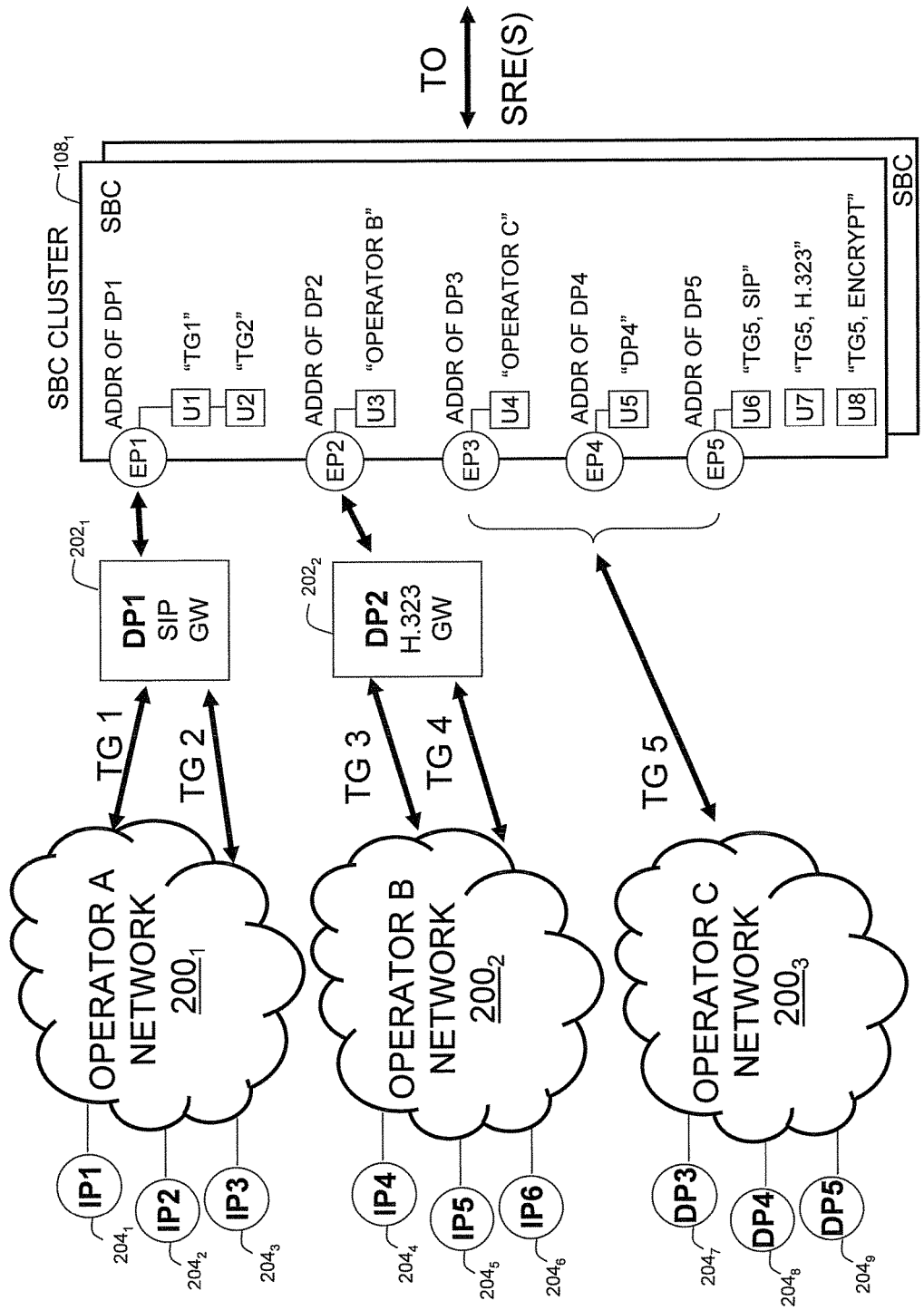
FIG. 2 depicts a block diagram of a session border controller (SBC) cluster according to an embodiment of the subject matter described herein.

FIG. 2 depicts a block diagram of a session border controller (SBC) cluster 108 for multiple networks 200, some or all of which may be session over Internet Protocol (SoIP) networks, according to an embodiment of the subject matter described herein. SoIP networks 200 may represent any packet network including those using SIP or H.323 protocols. As used herein, the term "session" refers to any packetized transaction traversing a SoIP network 200. For example, a voice over Internet protocol (VoIP) call is one type of SoIP session. The terms "call" and "session" are used interchangeably herein and may refer to the packets or messages which make up that call.

In the embodiment shown in FIG. 2, three networks $200_1$, $200_2$, and $200_3$, each controlled by a different operator or service provider, utilize SBC cluster 108. SBC cluster 108 may act as a logical unit for facilitating the flow of two-way SoIP traffic between the different networks including facilitating routing of signaling and media streams for SoIP traffic. SoIP devices 204 may send calls to SBC cluster 108.

Some or all of SoIP devices 204 may be provisioned at SBC cluster 108. As used herein, the term "provisioning" refers to the process by which an SBC is configured to recognize and communicate with a SoIP device. In one embodiment, SBC cluster 108 maintains logical structures called endpoints (EPs), each of which stores a network address for the "endpoint" (i.e., the provisioned SoIP device), with which the SBC may communicate. As used herein, the term "endpoint" will be used to refer to a network node with which the SBC cluster 108 may communicate, and the term "EP" will be used to refer to the data structure maintained by an SBC or SRE for maintaining a network address or other information for identifying the endpoint. In FIG. 2, EPs are represented as unfilled circles positioned on the periphery of the SBC and identified by name, such as "EP1", "EP2", etc.

In the embodiment illustrated in FIG. 2, SBC cluster 108 is provisioned to recognize and communicate with five endpoints: SIP gateway DP1 $202_1$, H.323 gateway DP2 $202_2$, DP3 $204_7$, DP4 $204_8$, and DP5 $204_9$. SBC cluster 108 maintains an EP data structure for each provisioned endpoint. In FIG. 2, SBC cluster 108 maintains EP1 through EP5, which store the network addresses of the five endpoints listed above, respectively. A single SoIP device may have multiple network addresses, in which case SBC cluster 108 may provision multiple EPs, each EP storing one of the multiple network addresses of the SoIP device. When an SBC or SBC cluster receives a message from an endpoint for which the SBC has provisioned an EP, the SBC is said to have "received a message at its EP". For example, in the embodiment illustrated in FIG. 2, a message sent from DP2 $202_2$ to SBC cluster $108_1$ is said to have been "received at" or "received by" EP1. For brevity, this may be described by saying that "EP1 received" a message. It may be understood that saying "a message was received by EP1" is shorthand for a process that may include steps such as receiving a message at an SBC, determining the source of the message (by packet source address or other), determining that an EP pointing to the source of the message has been provisioned on the SBC, and associating the received message to that EP.

In some cases, the provisioned SoIP device may be a gateway, a network switch, or a network routing node. In this scenario, the provisioned SoIP device may be shared by multiple network operators. It is desirable for the SBC cluster 108 to be able to discern whether a signaling message that it receives from the gateway came from one network operator or the other network operator. Although the SBC cluster 108 knows the network address of the gateway, which it maintains in an EP structure, the data stored in the EP structure is not sufficient to uniquely identify the network or network operator from which the message was sent.

Thus, in one embodiment. SBC cluster 108 maintains logical extensions to the EP structure, which are called uports, shown in FIG. 2 as unfilled square boxes connected to EPs and identified by name, such as "U1", "U2", etc. Uports maintain additional information which the SBC cluster may use to differentiate between different kinds of traffic. In FIG. 2, examples of additional information maintained by a uport are shown as text strings to the right of each uport. For example, uport "U1" contains the additional information "TG1", which identifies the trunk group to which uport U1 is associated. In one embodiment. SBC cluster 108 may maintain one uport for traffic from the first network and another uport for traffic from the second network. Alternatively. SBC cluster 108 may maintain one uport for SIP traffic and another uport for H.323 traffic, or one uport for traffic received along one trunk group and another uport for traffic received along another trunk group. Although originally referring to a set of physical connections between two PSTN nodes, as used herein the term "trunk group" has been extended to refer to any identifier of a node or network, including an IP or SS7 address of a node, a designation of a network interface or port, etc., as well as to an SS7 trunk group. Like for an EP described above, to say that "a message was received at a uport" or that "a uport receives a message" is shorthand for a process that may include the steps of receiving a message, determining the message source, associating the message to an EP based on the address of the message source, determining a further classification of the message, and associating the message to a uport based on the further classification of the message.

In the embodiment illustrated in FIG. 2, each of EP1 through EP5 has associated with it at least one uport. An EP will have as many uports as necessary to distinguish among the various types or categories of traffic that the SBC cluster 108 may receive from the associated endpoint.

In FIG. 2 for example, SBC cluster 108 receives two categories of SIP traffic from DP1 $202_1$: traffic that came through trunk group TG1 and traffic that came through trunk group TG2. Thus, EP1 has two uports, U1 and U2. Traffic that arrives from DP1 $202_1$ via TG1 will be associated with U1, and traffic that arrives from DP2 $202_1$ via TG2 will be associated with U2. In contrast, SBC cluster 108 also receives H.323 traffic through H.323 gateway DP2 $202_2$, but SBC cluster 108 doesn't care whether the traffic from DP2 $202_2$ came from TG3 or TG4; SBC cluster 108 only needs to know that this traffic is from operator network B $200_2$. Thus, EP2 has only one uport, U3. All traffic coming from DP2 $202_2$ will be categorized as "Operator B" traffic and associated with U3.

In FIG. 2, SBC cluster 108 also receives traffic from three endpoints or SoIP devices within Operator C's network $200_3$, namely DP3 $204_7$, DP4 $204_8$, and DP5 $204_9$. Each of these endpoints has been provisioned within SBC cluster 108, which maintains EP3. EP4, and EP5, respectively, for the three endpoints listed above. EP4 includes uport U4, which categorizes traffic from DP3 $204_7$ as "Operator C" traffic. EP5 includes uport U5, which categorizes traffic from DP4 $204_8$ as "DP4" traffic. EP6 subcategorizes traffic from DP5 $204_9$ into three categories, each category represented by uport U6, U7, and U8, respectively. U6 is for SIP traffic that came from DP5 $204_9$ along trunk group "TG5", U7 is for H.323 traffic that came from DP5 $204_9$ along trunk group "TG5", and U8 is for encrypted traffic came from DP5 $204_9$ along trunk group "TG5". Thus, using the combination of EP and uport it is possible to classify traffic based on a variety of characteristics, including network of origin, protocol, etc.

Additionally, classification information, such as information about trunk groups to or from an operator's network, may be determined by or conveyed to SBC cluster 108. For brevity, this classification information will be herein referred to as "trunk group information" regardless of whether the classification information is a trunk group identifier or other path identifier, an IP address or other node identifier, a network name or other network identifier, etc.

One function performed by SBC cluster 108 is determination of trunk group information for a message received by SBC cluster 108. In one embodiment, trunk group information relating to an operator's network 200 may be conveyed to SBC cluster 108. In the embodiment in FIG. 2, SIP gateway DP1 $202_1$ may be configured to include a trunk group parameter within messages that it sends to SBC cluster 108. Alternatively, SBC cluster 108 may determine trunk group information based on other parameters within the message or even from the physical connection for some SoIP devices 204 (e.g., when a trunk group (e.g., TG5) connecting an operator network (e.g., Operator 3 network $200_3$) is directly connected to SBC cluster 108).

Similarly, network-identifying or operator-identifying information (e.g., information about trunk groups to or from an operator's network) may be determined by or conveyed to an intermediary SoIP device 204 (e.g., DP1 (SIP gateway) $202_1$) from SBC cluster 108. Such determination may be based on provided parameters from SBC cluster 108 or other means. For example, DP1 $202_1$ and SBC cluster 108 may agree on trunk group identifiers when DP1 $202_1$ is provisioned and all call traffic to DP1 $202_1$ may have these identifiers included. The device configurations in FIG. 2 are illustrative; others configurations may be used.

SBC cluster 108 may include one or more SBCs. One exemplary SBC is the S3 SBC manufactured by GENBAND. SBC cluster 108 may be highly available (e.g., the plurality of SBCs may be in an active-standby configuration). SBC cluster 108 may communicate with network destinations such as Public Switched Telephone Network (PSTN), broadband network, consumer premises, enterprise network, SIP network, and H.323 network. In some cases, multiple SBC clusters may be interconnected in a single SoIP session (e.g., a SoIP session between broadband network and PSTN) involving two network destinations. A network destination may include an individual phone/computer terminal (as shown by IP1-IP3 of each operator's network 200) or an access point to another SoIP network (not shown). Each of the network destinations may be an endpoint from the perspective of the individual SBC that is connected to that network destination. SBCs may function in any of a variety of configurations including active-standby or load sharing. For example, one SBC of SBC cluster 108 may be active while a different SBC of SBC cluster 108 may be a standby or backup.

Figure 3:
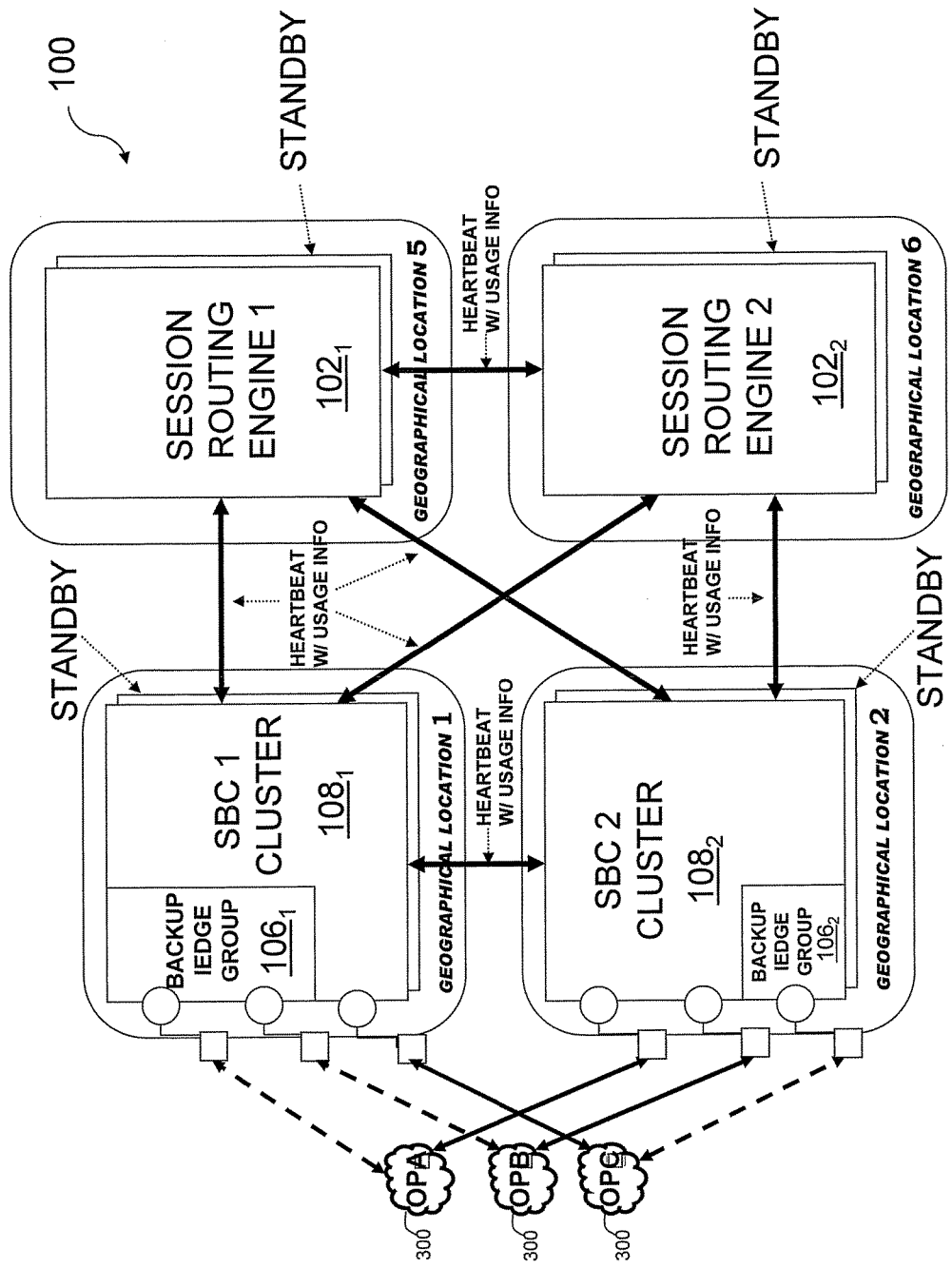
FIG. 3 depicts a diagram of a DCMA system illustrating resiliency features according to an embodiment of the subject matter described herein.

FIG. 3 is a diagram of a DCMA system 100 illustrating resiliency features according to an embodiment of the present subject matter. In this embodiment, each SBC cluster 108 includes an active node and a backup node. Likewise, each SRE 102 includes an active node and a backup node. A backup node may be a duplicate of its active counterpart and as such is identically provisioned. As shown, the backups in FIG. 3 are local to their active nodes. Such redundant configuration (i.e., active-standby configuration) provides network resilience in case of an active node failure. In one embodiment, each cluster 108 and SRE 102 has a standby which is capable of taking over its active counterpart's functionality (i.e., failover).

As shown in FIG. 3, each SBC cluster 108 within DCMA system 100 includes a backup iedge group 106. Backup iedge groups 106 represent logical groupings of one or more SoIP devices 300, such as intelligent edge (iedge) devices, provisioned at an SBC cluster 108 for secondary or backup use in DCMA system 100. For example, a SoIP device 300 may include an iedge device which is associated with routing calls at the edge of a network through a core network (e.g., routers, switches, routing switches, integrated access devices (IADs), and multiplexers) and often includes Quality of Service (QoS), authentication, and multi-service functions to manage different types of traffic. For illustrative purposes, three SoIP devices 300 are shown in FIG. 3. Each SoIP device 300 depicted represents a provisioned SoIP device from a different operator's network 200. For example, OPA 300 is a SoIP device in Operator A's network $200_1$, OPB 300 is a SoIP device in Operator B's network $200_2$, and OPC is a SoIP device in Operator C's network $200_3$. This example network is intended to be illustrative and not limiting. Alternative configurations are contemplated by the subject matter described herein.

In FIG. 3, backup iedge group $106_1$ indicates a group of some certain SoIP devices 300 (e.g., OPA and OPB) provisioned at SBC 2 Cluster $108_2$ for active or primary use and provisioned at SBC 1 Cluster $108_1$ for secondary or backup use (e.g., in case of a failure at the primary SBC cluster). Similarly, in FIG. 3, backup iedge group $106_2$ indicates a group of some other SoIP devices 300 (e.g., OPC) provisioned at SBC 1 Cluster $108_1$ for active or primary use and provisioned at SBC 2 Cluster $108_2$ for secondary or backup use (e.g., in case of a failure at the primary SBC cluster).

As stated above. SBC clusters 108 may be geographically diverse. In one embodiment, backup iedge groups 106 may provide network resiliency by acting like geographically diverse or non-local backup nodes. For example, if some certain SoIP devices 300 are provisioned at a primary SBC cluster $108_2$ and cluster $108_2$ malfunctions, backup iedge group $106_1$ may allow calls from these SoIP devices 300 to be handled by SBC cluster $108_1$. Thus, group call capacity of backup iedge group $106_1$ may be enabled, disabled, or modified based on the status or availability of cluster $108_2$ which serves as a primary node for some given SoIP devices 300 (e.g., OPA and OPB).

In one embodiment, backup iedge group call capacity may be set to zero simultaneous calls during normal operation to prevent any unwanted traffic through the backup SBC cluster 108. In another embodiment, backup iedge group call capacity may be set to some predefined amount greater than zero to prevent a complete outage situation. For example, if no call traffic is allowed on a backup iedge during normal operation, then during the time between a "primary" cluster failure and the backup iedge being notified and responding, referred herein as the "fail-over recovery period", there may be no call traffic at all (i.e., a complete outage situation). By allowing some amount of call traffic through at all times on a backup SBC cluster 108 at least some calls may be made or received during the fail-over recovery period.

DCMA system 100 may detect a failure of an SBC cluster 108. DCMA system 100 may use such information about SBC cluster failures to trigger capacity changes of backup iedges 106 for allowing call traffic through the backup SBC. In one embodiment, this capacity change may be done programmatically (e.g., a command-line interface (CLI) script may be written to dynamically change capacity based on SBC cluster availability). In another embodiment, capacity change may be done manually such as by a network operator or administrator.

DCMA system 100 may use a floating SBC capacity mechanism for call admission control and network resilience. In one embodiment, the floating SBC capacity mechanism includes exchanging periodic messages, referred to herein as "heartbeats", between two or more geographically diverse SBC clusters or neighbors. A heartbeat represents a communication indicating that a component is available. In one embodiment, a heartbeat may include capacity and usage information of the node or cluster that is sending the heartbeat. Heartbeats may be used by any components of DCMA system 100 including SBC clusters 108, SREs 102, and RSMs.

The operator of a DCMA system 100 may provide capacity to other network operators, such as on a contractual basis, where network operators pay higher fees for higher bandwidth through the DCMA backbone network. In one example of such a scenario, network Operator A may be guaranteed a capacity of up to 60 simultaneous calls through the DCMA system 100 while Operator B may have contracted for a capacity of 10 simultaneous calls. Where DCMA system 100 includes multiple diverse SBC clusters 108, an operator, such as Operator A, may desire that it be provided the 60 simultaneous calls, regardless of which SBC or SBC cluster the calls come through. A DCMA system 100 may use a floating SBC capacity mechanism to allow multiple SBC clusters 108 to handle calls from the same network operator (e.g., SoIP services supplier) and also allow CAC information synchronization between geographically distributed SBC clusters 108.

Using the scenario described above, Operator A may have a floating capacity of 60 simultaneous calls or sessions (e.g., as determined between Operator A and operator of DCMA system 100). At an initial moment in time, the capacity for Operator A may be allotted equally between a plurality of SBC clusters 108. For example, if Operator A's capacity is shared between two SBC clusters 108 then each cluster 108 may handle 30 simultaneous calls each for Operator A. In one embodiment. SBC clusters 108 may periodically (e.g., every 30 seconds) or other as-needed basis exchange heartbeat messages containing capacity and usage information for operators (e.g., Operator A). Using this information, capacity for an operator may be calculated for each SBC cluster 108. In one embodiment, capacity for a given operator may be reduced at a cluster having less peak simultaneous calls (e.g., SBC 2 cluster $108_2$) and be increased at a cluster having more peak simultaneous calls (e.g., SBC 1 cluster $108_1$).

In one embodiment, an exemplary calculation for determining new capacity of a given network operator at a periodic interval for each cluster in a floating capacity scenario may use the following formula:

$$\text{Capacity} = \text{PCC} + ((\text{MCO} - \text{CPC})/\text{CSC})$$

where PCC=peak simultaneous calls of the operator during periodic interval at a cluster being computed, MCO=maximum combined capacity for the operator, CPC=combined peak simultaneous calls of clusters sharing capacity for the operator during periodic interval, and CSC=clusters sharing capacity for the operator. Note that MCO and CSC are relatively static: that is, both the maximum combined capacity for an operator (MCO) and the clusters sharing that capacity (CSC) are typically set by the DCMA operator based on the agreement between the DCMA operator and the operator of the external network (e.g., Operator A). On the other hand, the peak number of calls at each cluster during an interval (PCC) can change depending on instantaneous traffic needs, which affects the combined peak number of calls across all clusters sharing that capacity (CPC).

In an example scenario, Operator A has customer capacity of 60 simultaneous calls (i.e., MCO=60) and two clusters sharing this capacity (i.e., CSC=2). At some initial point in time, cluster $108_1$ and cluster $108_2$ may each be allotted a capacity of 30 simultaneous calls for Operator A. After a given periodic interval usage information is exchanged. During this first interval, cluster $108_1$ handles a peak of 20 simultaneous calls and cluster $108_2$ handles a peak of 0 simultaneous calls for Operator A (i.e., CPC=(0+20)=20). In this example, PCC equals 20 at cluster $108_1$.

Thus, using the calculation of PCC+(MCO−CPC)/CSC, a new call capacity for Operator A at cluster $108_1$ may be determined to be 40 simultaneous calls (i.e., 20+(60−20)/

2=40). Additionally, when determining capacity at cluster $108_2$ PCC equals 0. Therefore, using the calculation of PCC+(MCO−CPC)/CSC, a new call capacity for Operator A at cluster $108_2$ may be determined to be 20 simultaneous calls (i.e., 0+(60−20)/2=20).

Call capacity may float or change (i.e., be redistributed) at periodic intervals or as necessary. In one embodiment, SBC cluster 108 may give back capacity for an operator only if the peak number of simultaneous calls at SBC cluster 108 is less than a capacity-sharing neighbor's for that operator during a given period.

It will be appreciated that DCMA system 100 may also use the exchange of information (e.g., heartbeats) between SBC clusters 108 and other components of DCMA system 100 to detect cluster failures. In one embodiment, a cluster $108_1$ which does not receive a heartbeat from a neighbor cluster $108_2$ for two consecutive time intervals may respond as if the neighbor cluster $108_2$ has failed (e.g., cluster $108_1$ may change capacity for a given operator to adjust for the failure of neighbor cluster $108_2$). In one embodiment, cluster $108_1$ response may include notifying other DCMA components or network operators of a neighbor's failure.

As stated above, heartbeats may be exchanged between components of DCMA system including SRE 102 and SBC clusters 108. In one embodiment, heartbeats may be used by an SBC cluster 108 to detect if an SRE 102 is available. If SRE 102 is not available. SBC cluster 108 may notify other components of DCMA system 100 or network operators. SBC clusters 108 may send calls to an available SRE 102. Similarly, in one embodiment, heartbeats may be used by an SRE 102 to detect if an SBC cluster 108 is available. In one embodiment. SRE 102 may notify other SBC clusters 108 including those with backup iedge groups 106 containing affected SoIP devices. SRE 102 may trigger iedge groups to increase capacity for the affected SoIP devices for re-routing traffic flow through backup SBC cluster 108. SRE 102 may also notify other components of DCMA system 100 or network operators. In one embodiment. SREs 102 may not attempt to route calls to unavailable SBC clusters 108. For example, all connections to a failed or unavailable SBC cluster 108 may be set to zero egress capacity directly or via an iedge group.

As discussed above. DCMA system 100 allows a plurality of SBC clusters 108 to interact with one or more SREs 102. These SREs 102 may make routing decisions for calls or sessions received by clusters 108. SoIP devices 204 including network operators' devices (e.g., SIP gateways) and customers' devices (e.g., VoIP phones) may interact directly with a SBC cluster 108. In one embodiment. SBCs may use internal trunk group routing for creating virtual tunnels from SoIP devices 204 to SREs 102. In one embodiment, these tunnels are bidirectional and as such may handle both ingress and egress traffic.

Figure 4A:
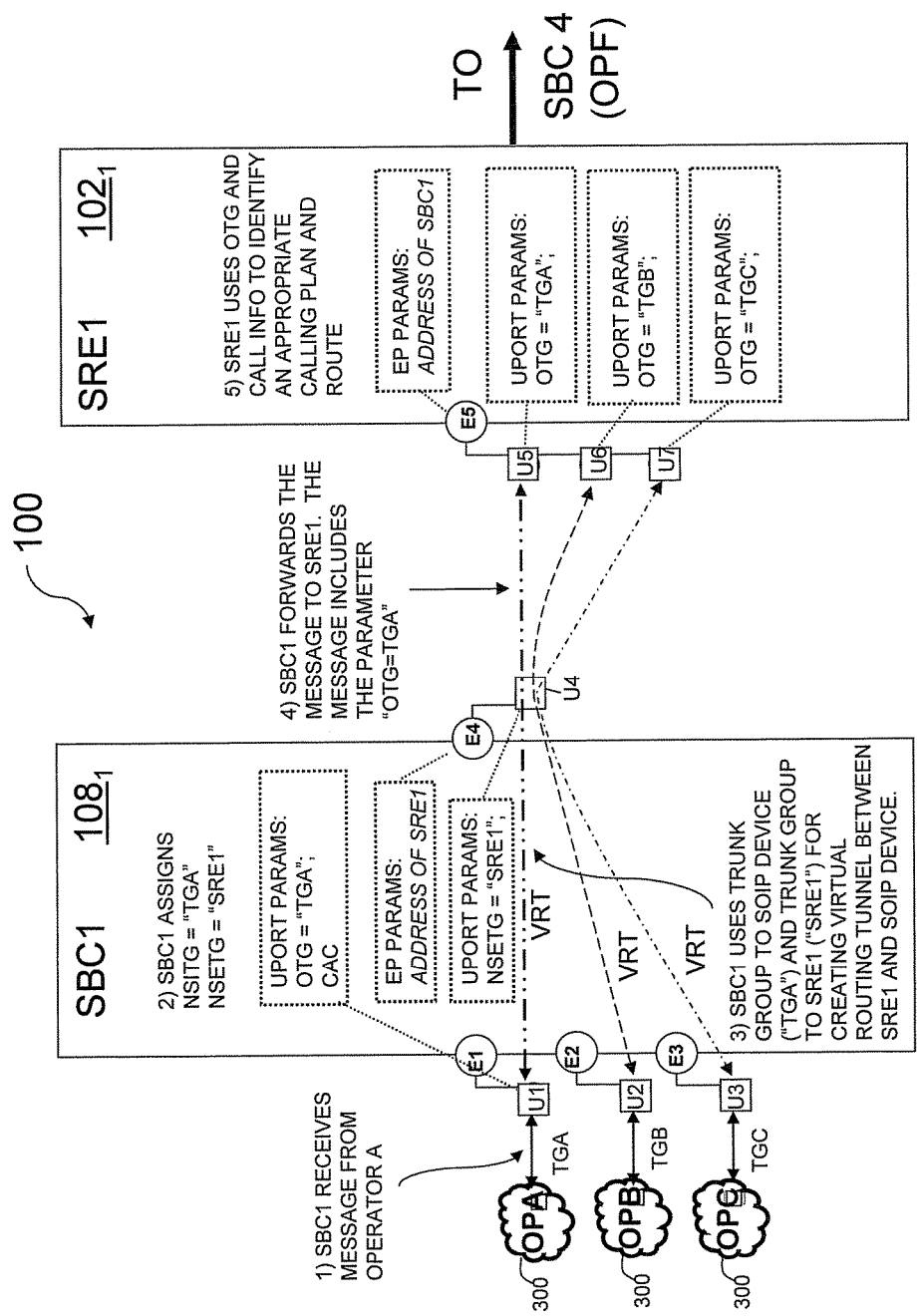
FIGS. 4A-4B illustrates routing between components in a DCMA system according to an embodiment of the subject matter described herein.
Figure 4B:
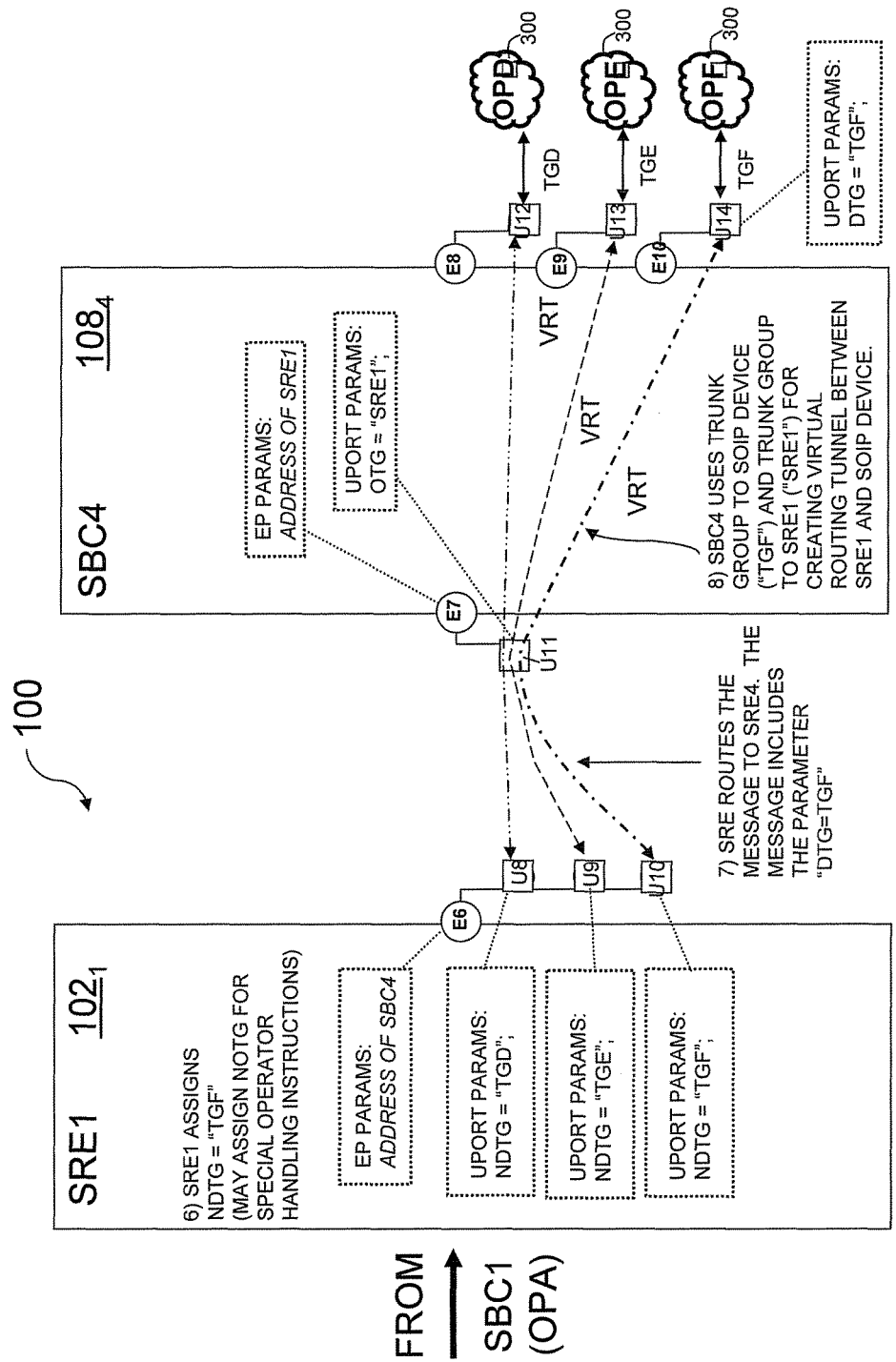

FIGS. 4A and 4B illustrate routing of a call between components in a DCMA system 100 according to an embodiment of the present subject matter. In FIGS. 4A and 4B. SoIP devices 300 are connected to SBC cluster 108 and SBC cluster 108 is connected to SRE 102 by logical endpoints (EPs) and uports. In the FIGS. 4A and 4B. EPs are shown as unfilled circles and uports are shown as unfilled squares. As stated above with respect to FIG. 2, an EP stores a network address of a node, called an endpoint, in DCMA system 100 and uports are logical extensions of EPs that distinguish call messages based on the message classification. In one embodiment, an EP may store the IP address and TCP or UDP port of an endpoint. Each EP may have multiple uports. Typically, at least one uport is created when an EP is provisioned.

As stated above, uports may represent different message types or classifications. Each uport configured in an SBC or SRE may be associated with particular instructions for handling messages or calls of that particular type of classification. For example, each uport may be associated with a particular protocol, trunk group, privacy policy, phone number prefix manipulation rule, calling plan, etc. For example, uports may be assigned based on a protocol of the incoming message. That is, a SIP message coming from a particular source node or network may be associated with one uport while an H.323 message coming from the same source node or network may be associated with a different uport.

In one embodiment, an SBC cluster 108 may use a provisioning database to determine how to process incoming call messages. A provisioning database at a SBC cluster 108 may include information about provisioned SoIP devices 300 and available SREs 102 in DCMA system 100. For example, the provisioning database may include information about trunk groups connecting SoIP devices 300 to SBC cluster 108 and information about trunk groups connecting SBC cluster 108 to SREs 102 of DCMA system 100. SBC cluster 108 may use provisioning database to determine whether a received call message (e.g., call setup message) should be sent to an SRE 102 for routing. In one embodiment, a uport for terminating calls (i.e., for accepting no call traffic) may be created for each EP at SBC cluster 108. This uport may be configured for no call capacity and may be logically assigned to calls that should not be routed. For example, if a call message comes in on an EP and does not match any provisioning pattern (e.g., trunk groups, calling plan, etc.), the call message may be logically assigned to the terminating uport (e.g., uport "0") for terminating the call with a lack of capacity cause code.

SBC cluster 108 may also use the provisioning database to determine which SRE 102 should process a given call message. That is, the provisioning database or some other database may contain information related to service agreements for network operators and DCMA system 100 configuration settings. In one embodiment. SREs 102 may be selected based on network or deployments requirements and/or service agreements. For example, calls sent to SREs 102 may be load balanced and/or prioritized based on uport configurations.

SREs 102 may receive call messages from SBC cluster 108. In one embodiment. SRE may logically assign EPs and uports based on the originating SBC cluster 108 and a specific provisioned SoIP device 300 at the originating SBC cluster 108. For example, an EP at SRE 102 may be assigned traffic from a specific SBC cluster 108. SRE 102 may assign a uport for each type of traffic from each SoIP device 300 provisioned at that SBC cluster 108. In one embodiment. SRE 102 may assign a uport to a call message based on information related to the call message's originating network (e.g., trunk group information included in the message). In one example, the trunk group information included in the call message may identify the originating trunk group (OTG) used to transmit the call message from an originating operator's network 200. SRE 102 may use the call message, including the OTG and assigned uport parameters, in querying a provisioning database and/or a routing database. The provisioning database and/or a routing database of SRE 102 may include similar information to the provisioning database of SBC cluster 108. In addition, the provisioning database and/or a routing database of SRE 102 may also include routing information, calling plans, and bindings. SRE 102 may use these databases in determining an appropriate route for the call message. In one embodiment, an appropriate route is based on a calling plan associated with the assigned uport. SRE 102 may route the call accordingly.

The operation of a DCMA system according to one embodiment of the subject matter described herein will now be described in more detail. In summary, an incoming message is received at an SBC. The SBC assigns the message to an EP based on the message's ingress "trunk group" (i.e., the message source) and assigns the message to a uport based on the message class, category, or other characteristic. The SBC sends the message, which includes ingress trunk group information, to the SRE for routing. The SRE receives the message, reads the ingress trunk group information within the message, and applies calling plans based on the ingress trunk group. If the message is allowed, the SRE uses the message's called party information to determine the route to the message destination, assigns the message to an egress trunk group, and routes the message, which includes egress trunk group information, to an SBC (which may be the same SBC as received the message). The SBC receives the outgoing message, reads the egress trunk group information within the message, and transmits the message out to the destination via the identified egress trunk group.

FIG. 4A depicts an ingress leg of a call message originating from SoIP device OPA 300. In general, ingress and egress are defined from the perspective of the collection of SBCs and SREs that make up DCMA system 100. That is, an ingress message is a message that is received at an SBC from an operator network or endpoint (i.e., not from another SBC or an SRE), and an egress message is a message that is sent from an SBC to an operator network or endpoint. From the perspective of SRE 102, messages received by SRE 102 are ingress messages and messages sent by SRE 102 are egress messages.

Using the embodiment illustrated in FIG. 4A, SBC1 108$_1$ receives an ingress message from operator A (OPA 300) via trunk group A (TGA). SBC1 108$_1$ identifies a call source, which in this example is the ingress trunk group TGA. As stated above, the term "trunk group" is used generically to identify the source of an ingress message or the destination of an egress message. In some cases, knowing the physical line, circuit, or network interface may be enough to unambiguously identify the source of the message. For example, if an SBC is connected to network operator OPA via only one SS7 trunk group, and that SS7 trunk group is not shared by another network operator, knowing that the message arrived at the SBC via that SS7 trunk group is enough to unambiguously identify OPA as the source of the message. In this example, the generic term "trunk group" refers to an actual SS7 trunk group in the traditional sense. In contrast, if messages from two network operators both use the same SS7 trunk group to communicate with the SBC, knowing that the message arrived via a particular SS7 trunk group is not enough to unambiguously identify the source of the message; other information, such as message parameters, is required. In this scenario, the "trunk group" is not an SS7 trunk group but is instead a name which is used to refer to the source. Similarly, where the SBC connects to more than one network operator via a shared IP network interface, knowing the network interface at which the message was received is not enough to distinguish the source of the message. In this scenario also, a "trunk group" does not refer to an SS7 trunk group but may be an internet address of the network operator, a name of the network operator, etc. Thus, a "trunk group" may be any identifier of a node or network, including an IP or SS7 address of a node, a designation of a network interface or port, etc., as well as to an SS7 trunk group.

The call message is associated with a public-side (i.e., facing the operator networks) EP and uport—E1 and U1. E1 points to the endpoint within operator A's network from which the message came, and U1 includes a parameter, OTG, that is used to store the name of the originating trunk group. The value of OTG is set to "TGA". While uport ingress parameters, such as parameter OTG, are shown, it will be appreciated that these parameters are for illustrative purposes. Other uport parameters, including egress parameters, such as destination trunk group parameter DTG, may also be present at each uport since connections are typically bidirectional.

In one embodiment, uport U1 may include a parameter indicating that SBC1 108$_1$ should apply call admission control (CAC) rules to the incoming message. In such embodiments, SBC1 108$_1$ may allow, block, or redirect the ingress call message according to the CAC rules.

In the embodiment illustrated in FIG. 4A, SBC1 1081 assigns two internal variables to each ingress call message: new source ingress trunk group (NSITG) and new source egress trunk group (NSETG), which respectively identify ingress and egress trunk groups from the perspective of the particular SBC. As stated above, the ingress trunk group may be the originating trunk group and the egress trunk group may be selected based on a load balancing algorithm or some other criteria. Using the example described above, the parameters NSITG and NSETG for the ingress call message are set to "TGA" and "SREI", respectively. SBC1 1081 looks for a private-side (i.e., facing the SREs) connection associated with an NSETG uport parameter that matches the NSETG parameter associated with the call message.

In this example, SBC1 108$_1$ identifies uport U4 of EP E4 which is associated with SRE1 102$_1$. SBC1 108$_1$ establishes a virtual routing tunnel between OPA 300 and SRE1 102$_1$. As used herein, a virtvial routing tunnel may generally be defined as a pathway between an origination and a destination. In one embodiment. SBC1 108$_1$ may use the trunk groups represented by the NSITG and NSETG parameters for creating a virtual routing tunnel between OPA 300 and SRE1 102$_1$. SBC1 108$_1$ may maintain this information for an appropriate period (e.g., in a state database for calls in progress) and may use this maintained information for quickly forwarding the call message and other messages associated with the call.

In one embodiment, the identity of the source or destination of messages may be stored as fields, parameters, or variables having descriptive names. For example, the identity of the originating or ingress trunk group may be stored in a variable named "OTG" or "ITG", while the identity of the destination or egress trunk group may be stored in a variable named "DTG" or "ETG". Each field, parameter, or variable may contain a value. For example, a variable "ITG" may be set to a value of "TG3", indicating that for this particular message, the ingress trunk group was "TG3". Other values could be used, such as "VPN5", "From Operator A", or other descriptive value. In such embodiments, a reference to the variable containing the identifier of the trunk group may be considered synonymous with a reference to the trunk group itself. For example, to say that "a message was received by the SBC via TG1" may be synonymous with the phrase "the message received by the SBC had an ITG value of TG1".

In FIG. 4A, SBC1 $108_1$ sends the call message including the call source information "OTG=TGA" to SRE1 $102_1$. In the figure, the call message is received at SRE1 $102_1$ and is associated with uport U5 of EP E5. A provisioning database and/or routing database may be maintained at SRE1 $102_1$ for determining calling plans and routing decisions for calls. Calling plans and routing decisions may be based on network conditions and/or service agreements between operators. In one embodiment. SRE1 $102_1$ may use the call source information (or the OTG parameter as it may be known by SRE1 $102_1$) and other call information, such as called party or call destination, as lookup criteria for these databases. That is, the provisioning database at SRE1 $102_1$ may contain information about calling plans for each call source (e.g., network operators) in the DCMA system 100. SRE1 $102_1$ may use the call source information of a message as a lookup in the provisioning database to determine and select which calling plan to apply in routing the call associated with that message. The routing database at SRE1 $102_1$ may be used to determine an appropriate route for the call associated with the message. SRE1 $102_1$ may use the selected calling plan, along with other call information, such as called party, to determine and select an appropriate route for the call message from the routing database.

FIG. 4B depicts an egress leg of the call message in FIG. 4A. Egress, as used in FIG. 4B, represents traffic leaving SRE1 $102_1$ being routed to the destination SoIP device OPF 300. In FIG. 4B. SRE1 $102_1$, has determined an appropriate route to destination SBC4 $108_4$ using a calling plan based on the call source information (e.g., the originating network) in a received call message. On egress, SRE1 $102_1$ assigns internal variables to the call message being routed. These internal variables may include a new destination trunk group (NDTG) and a new originating trunk group (NOTG) parameter. The NDTG parameter represents a trunk group for reaching a destination. In FIG. 5B, the NDTG parameter represents a destination SBC4 $108_4$ (i.e., the cluster through which a call destination OPF 300 may be reached). In another example, the NDTG parameter may represent a different trunk group than the trunk group of the destination SBC 108. For example, the NDTG parameter may represent a trunk group to another SRE 102 (e.g., to an SRE2 $102_2$ in a set of SREs 102 with different routing information provisioned than SRE $102_1$ such as discussed below and illustrated in FIG. 6).

In one embodiment, the NOTG parameter may represent a trunk group to SRE1 $102_1$. In another embodiment. NOTG may be used for specific operator network handling instructions. For example, Operator F may require that all call traffic from Operator A be seen as coming from Operator B or originating from within Operator F's network. In this example, NOTG may equal "TGB".

In FIG. 4B, the parameters NDTG is set to "TGF" (NOTG is not set). SRE1 $102_1$ looks for an egress connection associated with this NDTG uport parameter that matches the NDTG parameter associated with the call message (e.g., uport U10 of EP E6). SRE1 $102_1$ may route the call message including information, such as the NOTG parameter (e.g., as an OTG parameter), and the NDTG parameter (e.g., as a DTG parameter), to an egress SBC or another SRE. In FIG. 5B, SRE1 $102_1$ routes the call message including the call destination information "DTG=TGF" to SBC4 $108_4$.

SBC4 $108_4$ may receive the call message and forward, using provisioning information and call message information, the call message to provisioned SoIP device OPF 300 using an appropriate trunk group. In one embodiment, the call destination information may be used as a lookup value in a maintained provisioning database for selecting an appropriate EP/uport and associated trunk group for sending the call message to its destination (e.g., OPF 300). In FIG. 4B, SBC4 $108_4$ may create a virtual routing tunnel by matching trunk groups. For example, SBC4 $108_4$ may identify call message destination by matching the DTG parameter of the message received from SRE $102_1$ with the provisioned DTG for the SoIP device EP and create a virtual routing tunnel. SBC4 $108_4$ may maintain this information for an appropriate period (e.g., in a state database for calls in progress) and may use this maintained information for quickly forwarding the call message and other messages associated with the call.

Figure 5:
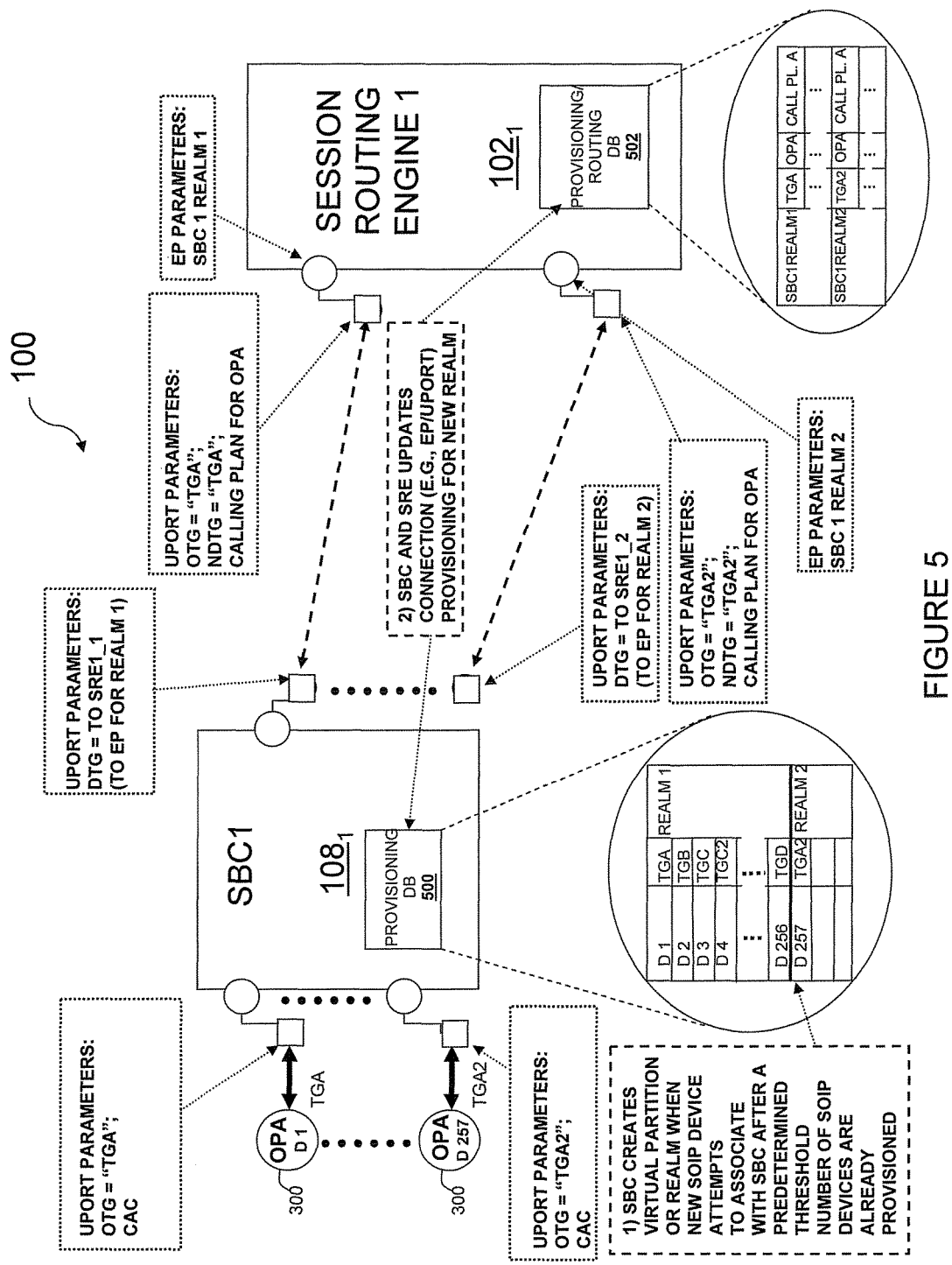
FIG. 5 illustrates virtual partitioning and related connection provisioning of components in a DCMA system according to an embodiment of the subject matter described herein.

FIG. 5 illustrates virtual partitioning and related connection provisioning of components in DCMA system 100 according to an embodiment of the present subject matter. As stated above. EPs represent logical connection endpoints. It is appreciated that such EPs relate to physical connection endpoints and as such usage of EPs and uports may have physical limitations. That is, an SRE 102 and SBC 108 may have only a finite number of EPs and uports available for connections.

In one embodiment, an SBC 108 may be divided into realms or virtual partitions. In one embodiment, a virtual partition may be represented by realm identifiers, such as a realm signaling address (RSA). A realm identifier may be a logical IP address for communicating between SBC1 $108_1$ and other components in a DCMA system 100. Each virtual partition allows provisioning of a threshold amount of SoIP devices or EPs. For example, 256 EPs may be the maximum amount of EPs identified with a given realm or RSA of SBC 108. In one embodiment, an SBC 108 may create a virtual partition or realm to allow more SoIP devices 300 to be provisioned.

In FIG. 5, D257 300 represents a SoIP device from Operator A's network attempting to associate with SBC1 $108_1$ after a specific number or threshold of devices have already been provisioned (e.g., 256 unique SoIP devices 300 may be threshold number). D257 300 attempts to associate after all current virtual partitions or realms are full (i.e., threshold number for Realm 1 has been reached) at SBC1 $108_1$. In one embodiment, threshold number of SoIP devices 300 relate to the number of available uports of EPs at SRE $102_1$. In this embodiment, when no more unique call traffic may be associated to an EP at SRE $102_1$, SBC1 $108_1$ creates a virtual partition for provisioning D257 300.

As stated above, virtual partitioning may include assigning new realm identifiers or unique IP addresses for communicating call traffic in DCMA system 100. As such, virtual partitioning may require updating provisioning databases (e.g., database 500 at SBC1 $108_1$). For example, provisioning may include registering D257 300 at SBC1 $108_1$ including storing trunk group information about D257 300, such as a DTG for sending traffic to D257 300. Provisioning D257 300 at SBC1 $108_1$ may also include associating trunk group information with a realm identifier and creating a unique public-side EP and related uports for receiving calls from D257 300.

Additionally, SBCs 108 and SREs 102 may update their respective provisioning databases (e.g., databases 500 and 502) including private-side EP and uport provisioning information for handling call traffic from a new realm. For example, uports on the "private side" of SBC $108_1$ (i.e., the side facing the SRE $102_1$) may be created or updated to send traffic including a realm identifier for assigning traffic to a different EP at SRE $102_1$. Each EP at SRE $102_1$ may be assigned traffic from SoIP devices 300 provisioned on SBC1

$108_1$ using realm identifiers. For example, each EP at SRE $102_1$ may represent call traffic received from a unique IP address of a SBC1 $108_1$.

As stated above, SBC1 $108_1$ may determine which SRE $102_1$ receives the call message based on a variety of criteria including network conditions, system configurations, and service agreements. Such determinations may also be made based on the realm involved. As shown in FIG. 5, each private-side EP/uport at SBC1 $108_1$ provides an RSA identifier in addition to an SRE identifier to SRE $102_1$. In one embodiment, SBC1 $108_1$ may send a call message to SRE $102_1$ based on the SBC realm the SoIP device is provisioned.

Each EP and its uport at SRE $102_1$ may be assigned based on a realm identifier and a SoIP device identifier (e.g., trunk group information) to distinguish SoIP devices provisioned in different realms. For example, SRE $102_1$ may assign a given EP at SRE $102_1$ call traffic from a given realm of SBC1 $108_1$. Each uport of that EP at SRE $102_1$ may be assigned call traffic from a specific SoIP device provisioned in that realm. Using the realm identifier and SoIP device identifier (e.g., trunk group information). SRE $102_1$ may determine an appropriate calling plan and route. In FIG. 5, provisioning/routing database 502 includes information associating trunk group information for a given realm of SBC1 $108_1$ with a network operator (e.g., Network Operator A). Additionally, this information is associated with a calling plan. As such, SRE $102_1$ may use routing information in provisioning/routing database 502 for determining an appropriate route based on the associated calling plan.

Virtual partitioning allows SBCs 108 to provision more SoIP devices 300 in DCMA system 100 without overwhelming DCMA system 100 resources. Further, such partitioning allows SREs 102 to identify a network operator for providing an appropriate calling plan and route for each call. It will be appreciated that virtual partitioning and related provisioning may be handled programmatically or manually. In one embodiment, a real-time session manager (RSM) may dynamically provision each component of DCMA system 100 as necessary. For example, RSM may be informed when a new SoIP device 300 is attempting to register with an SBC1 $108_1$ when all current SBC realms are full. The RSM may trigger the SBC1 $108_1$ to create a virtual realm and provision itself for an additional realm's traffic (e.g., provision additional EPs and uports at SBC1 $108_1$ to handle the new realm). The RSM may also trigger SREs 102 to provision themselves for this additional realm at that given SBC1 $108_1$. The RSM may use information received by components of DCMA system 100 to provide such functionality. In another embodiment, each component of DCMA system 100 may provision itself as necessary.

In one embodiment. SIP messages may be used for communications between and to components in a DCMA system 100. For example, SIP messages may be used in sending and routing calls in a DCMA system 100. That is, all non-SIP messages may be converted by SBC clusters 108 to similar SIP messages before being sent to SREs 102 for routing. SBC cluster 108 may provide an inter-working function (IWF) for converting between signaling protocols (e.g., converting a SIP message back to H.323 message when the message leaves SBC cluster 108 for originating network). Additionally. SIP messages may be used in provisioning including creating and/or updating connections (e.g., a SIP options message may inform a DCMA component to update their EPs and uports).

Another aspect of the present subject matter includes hierarchical routing within DCMA system 100. As stated, SREs 102 may be used for routing calls received by SBC clusters 108 in a DCMA system 100. As discussed, in one embodiment, SREs 102 have identical routing information including identical calling plans, routes, and bindings provisioned. According to another embodiment, DCMA system 100 may use a plurality of SREs 102 with at least one SRE 102 having different routing information provisioned. For illustrative purposes. SREs 102 with identical routing information provisioned may be thought of as a group. For example, SREs 102 in a first group may handle routing for a specific area, and, as such, each of these SREs 102 is provisioned with identical routing information. One of these SREs 102 may send a call message to a second group of SREs 102 for routing if they are unable to route the call message appropriately or completely to a destination. The second group of SREs 102 may be provisioned with different routes or calling plans than the first group but each SRE 102 of the second group is provisioned with identical routes or calling plans. Calls may be sent (e.g., using interconnecting SRE trunk groups) to different groups of SREs 102 until one group is able to route the call message.

Figure 6:
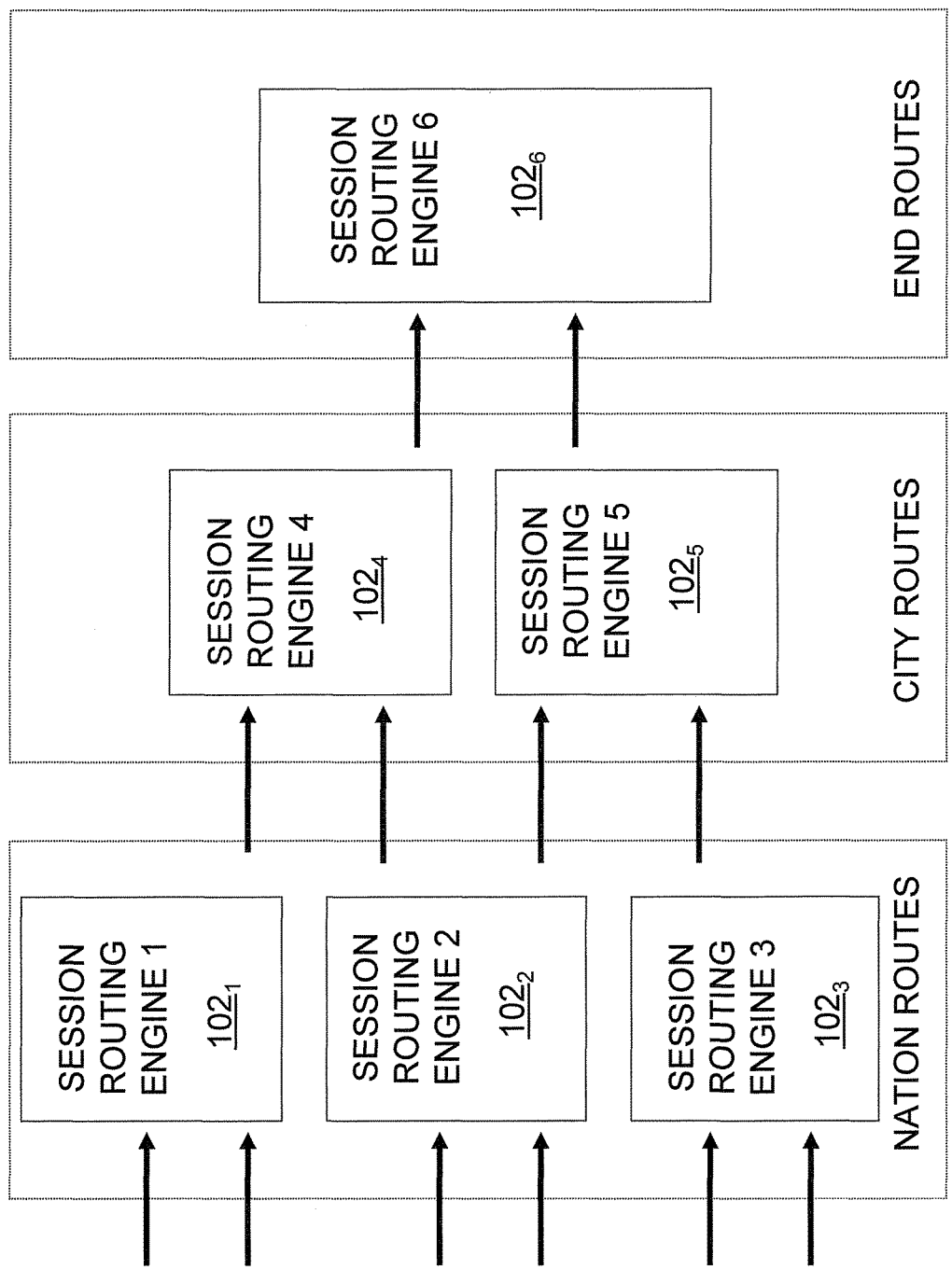
FIG. 6 depicts a high level abstraction diagram of hierarchical routing according to an embodiment of the subject matter described herein.

FIG. 6 is a high level abstraction diagram of hierarchical routing according to an embodiment of the subject matter described herein. In one embodiment. SREs $102_{1-3}$ receive call messages for routing. SREs $102_{1-3}$ may represent SREs 102 which are provisioned with routes for routing international calls. One of SREs $102_{1-3}$ may not have an appropriate route (i.e., complete route) for a given call message and may determine a possible SRE 102 or group of SREs (e.g., $102_{4-5}$) that may be able to further route the call message. SREs $102_{1-3}$ may send the call message to one of SRE $102_{4-5}$ for further routing. One of SREs $102_{4-5}$ may receive the call message and determine they are unable to route the call message appropriately or completely. SREs $102_{4-6}$ may have routes for routing calls between cities but not for a specific call message destination. As such, SREs $102_{4-6}$ may send the call message to SRE $102_6$ for routing to specific destination endpoints. SRE $102_6$ may have routes for routing calls to certain call message destinations (e.g., may have routes to call message destination within a given area like a town or city). As such, SRE $102_6$ may appropriately route the call message to its destination.

Figure 7:
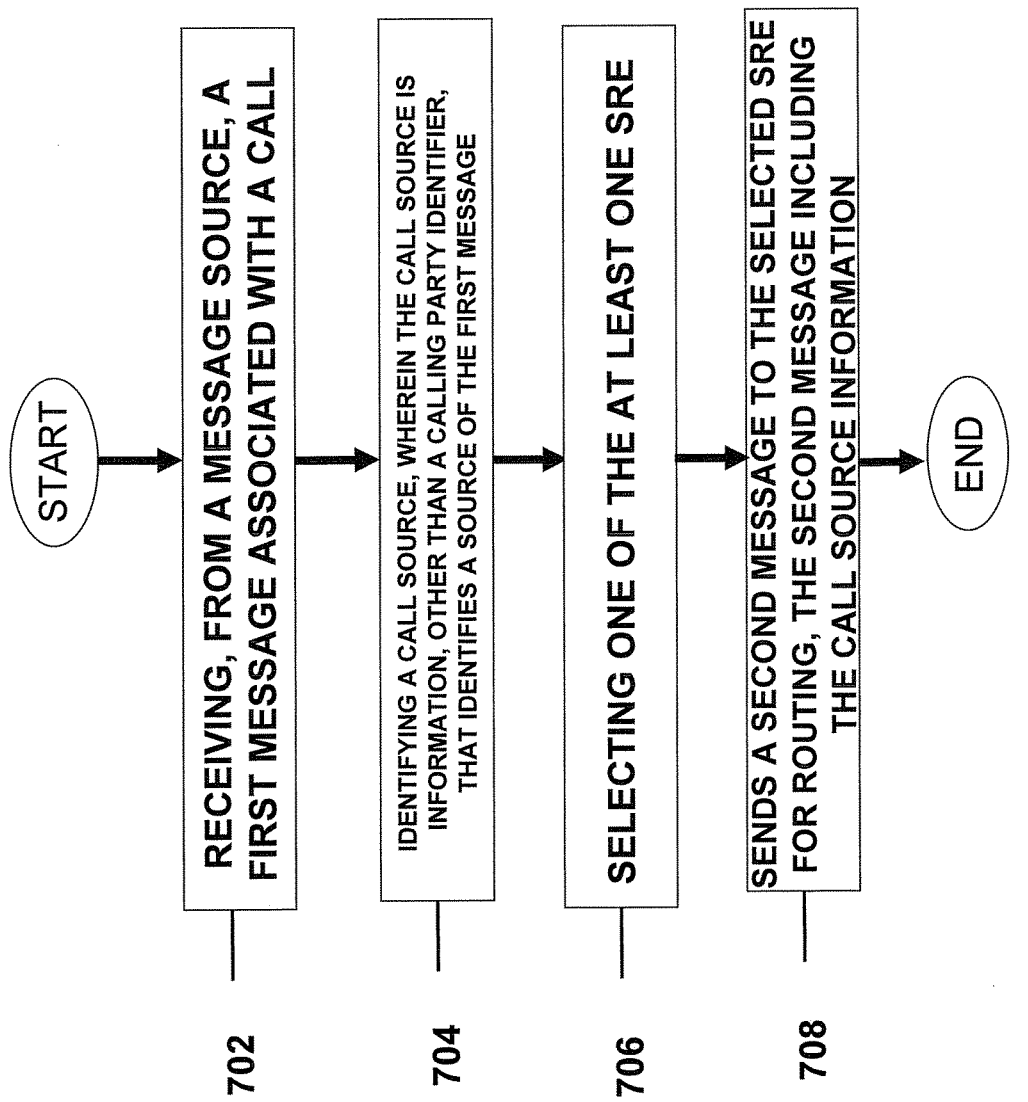
FIG. 7 depicts a flow chart of exemplary steps for performing routing of calls using a DCMA system according to an embodiment of the subject matter described herein.

FIG. 7 is a flow chart of exemplary method 700 for performing routing of calls using DCMA system 100 according to an embodiment of the present subject matter. In this embodiment, exemplary method 700 occurs at an ingress SBC in a DCMA system that includes at least one SRE for routing messages in the DCMA system. In one embodiment, the ingress SBC may be located in a cluster.

Exemplary method 700 starts at block 702. In block 702, ingress SBC receives, from a message source, a first message associated with a call. In one embodiment, the ingress SBC facilitates the interconnection of calls between IP networks by preparing the call message for routing by an SRE 102. For example, in FIGS. 4A-4B, a call message is sent to SRE for routing messages associated with the call from Operator A's Network (e.g., OPA 300) to Operator F's Network (OPF 300). In block 704, ingress SBC identifies a call source, wherein the call source is information, other than a calling party identifier, that identifies a source of the first message. For example, call source information may include network-identifying or network operator identifying information, such as trunk group information. In FIG. 4A, SBC1 $108_1$ identifies the call message as originating from Operator A's Network (e.g., OPA 300) using trunk group information "TGA". In one embodiment, the SBC may associate a NSITG and a NSETG parameter to a call message. The SBC may include call source information associated with the parameters in a new call message based on the received call message before sending it to an SRE for routing. In FIG. 4A, SBC1 $108_1$ assigns NSITG="TGA" and NSETG="SRE1." In block 706, ingress SBC selects one of the at least one SRE. This selection may be determined by the NSETG parameter which may be based on a variety of criteria including load balancing algorithms, availability, and call or device priority. As shown in FIG. 4A, SBC1 $108_1$ selects SRE1 $102_1$ associated with EP E4 and uport U4 that matches the assigned NSETG parameter. In block 708, ingress SBC sends a second message to the selected SRE for routing, the second message including the call source information. The second message is associated with the call and may include information, including calling party or called party, from the first message. In FIG. 4A, SBC1 $108_1$ forwards the new message to SRE1 $102_1$ including the call source information as an OTG parameter (i.e., "OTG=TGA").

The selected SRE may receive the second message and use the call source information, such as network-identifying parameters, in determining an appropriate calling plan. For example, calling plans may be based on call message completion rates, route profit, route availability, or a combination thereof. Using the determined calling plan, the SRE may determine and select an appropriate route for the second call message. For example, SRE 102 may use call source information to determine that the call message is from a network operator which requires least cost routing and as such selects a route based on this preference. In another example, a different network operator may require most profit routing and as such SRE 102 selects a route accordingly. The SRE may route the second message associated with the call according to the selected route.

Figure 8:
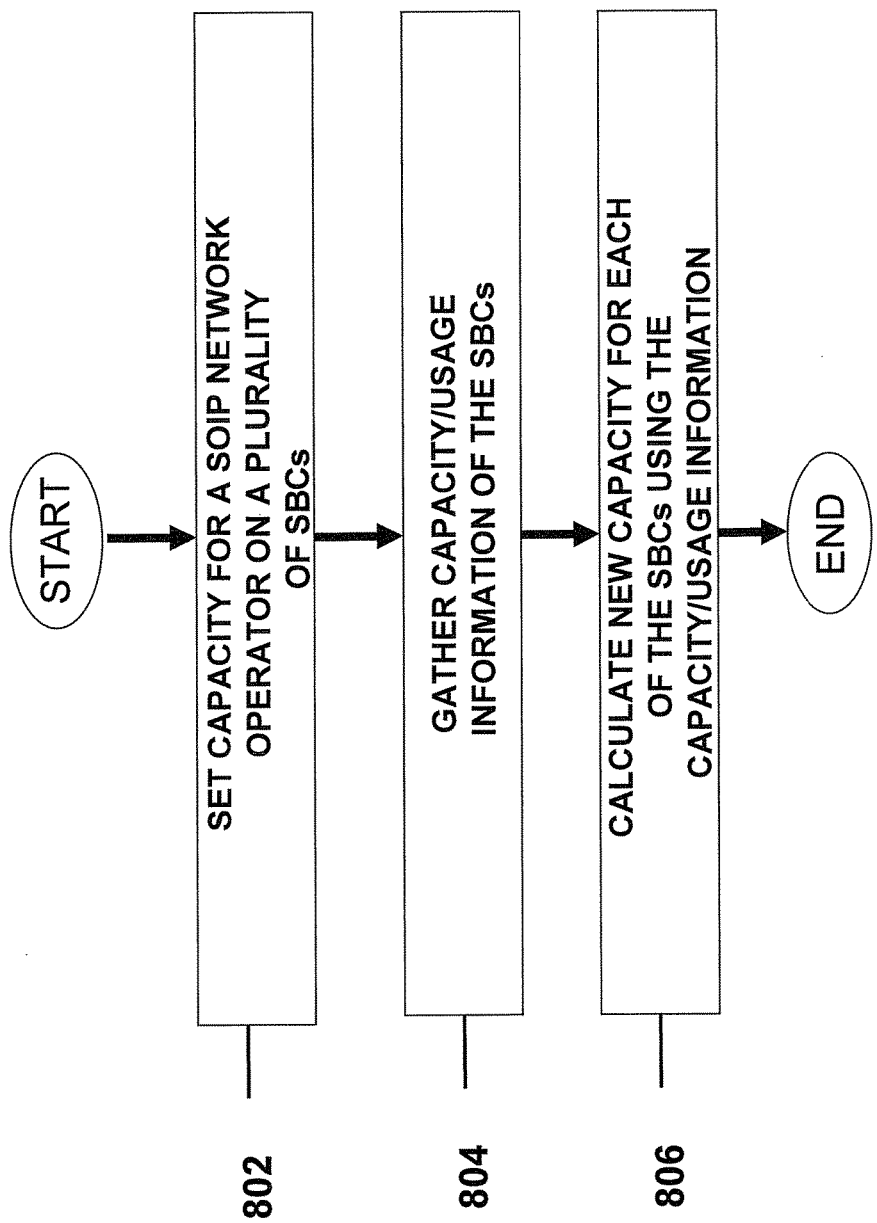
FIG. 8 depicts a flow chart of exemplary steps for performing dynamic call capacity synchronization in a DCMA system according to an embodiment of the subject matter described herein.

FIG. 8 is a flow chart of exemplary method 800 for performing dynamic call capacity synchronization in DCMA system 100 according to an embodiment of the present subject matter. Exemplary method 800 starts at block 802. In block 802, capacity of a network operator (e.g., Operator A from FIG. 1) is shared between a plurality of SBCs. In one embodiment, the SBCs may be located in one or more clusters. In one embodiment, each SBC in the shared arrangement may initially be given an equal portion of capacity to provide. For example, in FIG. 3, SBC1 $108_1$ and SBC2 $108_2$ may share call capacity for Operator A's Network $200_1$. In one embodiment, capacity shared between the SBCs may be based on a service agreement or network conditions. The plurality of SBCs may be configured to share usage/capacity information between each other. In block 804, usage/capacity information is gathered for the plurality of SBCs. In one embodiment, this information may be shared or exchanged with other components of the network include a RSM or network administrator. In one embodiment, this information may include a heartbeat and usage information relating to the capacity of the shared network operator. In one embodiment, the exchange of information may be performed at predetermined intervals (e.g., every 30 seconds). In another embodiment, the sharing of information may be performed dynamically or through requests (e.g., requests from a network administrator or a request from SBC1 $108_1$ when being heavily used by Operator A's Network $200_1$). In block 806, capacity of the network operator for each SBC may be calculated using the usage information exchanged. The calculation may include Capacity=PCC+((MCO−CPC)/CSC) as described above.

In one embodiment, each SBC may perform its own capacity calculation. In another embodiment, a RSM or other similar device may perform these calculations and provide the appropriate capacity or capacity change to each cluster. The capacity calculations may include a variety of criteria including network conditions, service agreements, and call message parameters.

In one embodiment, the functionality of a DCMA system may be described as modules, applications or processes. It is understood that these modules or processes may be implemented as computer-executable instructions embodied in a computer-readable medium that may be executed by a processor to perform at least one method (e.g., method 800 detailed above). Alternatively, the modules or processes described herein may be implemented entirely in hardware. In yet another alternative embodiment, the modules or processes described herein may be implemented as a combination of hardware and software.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A session border controller (SBC) system in a session over Internet Protocol (SoIP) network, the system comprising:
   a plurality of session routing engines (SREs) for routing calls in the SoIP network; and
   at least one session border controller (SBC) for:
      receiving, from a message source identified by a calling party identifier, a first message associated with a call in the SoIP network;
      identifying a source network, wherein the source network is identified based on information, other than the calling party identifier, that identifies a network providing SoIP services to the message source;
      identifying a calling plan applicable to the source network, wherein the calling plan specifies routing requirements applicable to the message source;
      selecting an SRE from the plurality of SREs where the selection is based on the calling plan for the source network, and
      sending to the selected SRE, information associated with the message, the information including the source network, wherein the selected SRE routes messages associated with the call based on the calling plan routing requirements associated with the source network.

2. The system of claim 1, wherein the information other than the calling party identifier associated with the message source comprises at least one of: an IP address, a physical trunk group, and a logical trunk group.

3. The system of claim 1, wherein the SBC determines the information other than the calling party identifier associated with the message source based on at least one of: information contained within the message, a physical connection by which the SBC receives the message, and a logical connection by which the SBC receives the message.

4. The system of claim 1, wherein the selected SRE is selected based on at least one of: a relative available capacity of the selected SRE and a predetermined association of the message source to the selected SRE as specified by the calling plan.

5. The system of claim 1, wherein sending to the selected SRE information associated with the message includes modifying and forwarding to the selected SRE the message received by the SBC or sending a second message to the selected SRE, the second message including information from the message received by the SBC.

6. The system of claim 1, wherein sending to the selected SRE information associated with the message includes performing a SIP interworking function for converting the message from a non-SIP protocol into a SIP protocol and sending the SIP protocol message to the selected SRE.

7. The system of claim 1 wherein routing messages based on the identified calling plan includes selecting a route based on a trunk group associated with the source network.

8. The system of claim 7 wherein selecting a route based on the identified calling plan includes route selection based on at least one of: call completion rates, route profit, route availability, or quality of service (QoS).

9. The system of claim 1 wherein the at least one SBC comprises a plurality of SBCs.

10. The system of claim 9 wherein the plurality of SBCs is organized into at least one SBC cluster.

11. The system of claim 10, further comprising:
a floating capacity mechanism for allowing at least two SBC clusters to share capacity for the source network, wherein the capacity shared by each of the at each of the at least two SBC clusters dynamically changes based on usage information and availability information exchanged between the at least two SBC clusters at periodic intervals.

12. The system of claim 11, wherein a portion of shared capacity is redistributed from an SBC with less peak simultaneous calls from the source network to an SBC with greater peak simultaneous calls from the source network in the periodic interval.

13. The system of claim 9, wherein at least some of the plurality of SBCs are arranged in a redundant configuration.

14. The system of claim 9, wherein at least one of the plurality of SBCs is geographically diverse from another of the plurality of SBCs.

15. The system of claim 1, wherein the plurality of SREs is organized into at least one SRE cluster.

16. The system of claim 1, wherein at least some of the plurality of SREs are organized into a redundant configuration.

17. The system of claim 1, wherein at least one of the plurality of SREs is geographically diverse from another of the plurality of SREs.

18. The system of claim 17, wherein at least one of the geographically diverse SBC acts as a backup SBC for the at least one message source associated with a second geographically diverse SBC.

19. The system of claim 1, wherein the at least one SBC creates a virtual routing tunnel between the selected SRE and the message source.

20. The system of claim 1, wherein the at least one SBC performs call admission control (CAC) for received calls.

21. The system of claim 1, wherein the at least one SBC detects malformed packets and prevents sending of the malformed packets to the selected SRE.

22. The system of claim 1, wherein the at least one SBC is connected to at least two SREs of the plurality of SREs and wherein the at least two SREs have identical routing information provisioned.

23. The system of claim 1, further comprising:
an SRE provisionable by substantially replicating a provisioning database of the selected SRE.

24. A method for routing calls system, the method comprising:
at an ingress session border controller (SBC) that includes a plurality of session routing engines (SREs) for routing messages in the system:
receiving, from a message source identified by a calling party identifier, a first message associated with a call;
identifying a source network, wherein the source network is identified based on information, other than the calling party identifier, that identifies a network providing SoIP services to the message source;
identifying a calling plan applicable to the source network, wherein the calling plan specifies routing requirements applicable to the message source;
selecting an SRE from the plurality of SREs where the selection is based on the calling plan for the identified source network, and
sending a second message to the selected SRE, wherein the second message comprises the source network information, and wherein the call source information is used by the selected SRE to route the first message based on the calling plan routing requirements associated with the source network.

25. The method of claim 24 wherein sending the second message comprises one of:
modifying the first message to include the call source information and sending the modified first message as the second message;
creating a new message including information from the first message and also including the call source information, and sending the new message as the second message; and
determining whether the first message is a malformed message, and, in response to determining that the first message is a malformed message, discarding the first message and failing to send the second message.

26. The method of claim 24 wherein sending the second message comprises one of:
performing a call admission control operation with regard to the second message;
identifying a call destination, wherein the call destination is information, other than a called party identifier, that identifies a network providing SoIP series to a called party; and
selecting an egress SBC based on the identified call destination information and forwarding the second message to the egress SBC, wherein the egress SBC may be the same as or different from the ingress SBC.

27. The method of claim 26, wherein the egress SBC selected is in a first level of SBCs in a hierarchy, wherein each level of the hierarchy of SBCs includes different routes for routing calls; wherein the egress SBC selected determines an appropriate route or determines a second egress SBC in a second level of the hierarchy.

28. The method of claim 26, wherein the egress SBC creates a virtual routing tunnel between the selected SRE and a destination of the second message based on the call destination information.

29. The method of claim 24 wherein, prior to sending the second message to the selected SRE for routing, the SBC performs a call admission control (CAC) operation to determine whether the call should be processed, and wherein the SBC sends the second message to the selected SRE for routing only upon a determination the call should be processed.

30. The method of claim 24, wherein selecting the SRE is based on at least one of: a capacity of the selected SRE; a priority of the first message; and a predetermined association of the call source to the selected SRE.

31. The method of claim 24, wherein at least one of the plurality of SREs is geographically diverse from another of the plurality of SREs.

32. The method of claim 24, wherein the system comprises a plurality of SBCs and wherein at least one of the plurality of SBCs is geographically diverse from another of the plurality of SBCs.

33. The method of claim 24, further comprising:
gathering call usage information of the ingress SBC, wherein the ingress SBC is assigned a portion of a call capacity of the network providing SoIP services to the source of the first message; and
determining a new assigned portion of the call capacity of the network for the ingress SBC based on the usage information.

34. The method of claim 33, wherein gathering call usage information of a plurality of SBCs includes exchanging call usage information between the plurality of SBCs.

35. The method of claim 34, wherein the method occurs at periodic intervals.

36. The method of claim 33, wherein determining a new call capacity includes redistributing a relative portion of capacity from at least one of the SBCs with less peak simultaneous calls from the provider of SoIP services to at least one of the SBCs with greater peak simultaneous calls from the provider of SoIP services in the periodic interval.

37. A computer readable storage device having stored thereon computer executable instructions that when executed by a processor of a computer perform steps comprising:
at an ingress session border controller (SBC) in a communication network that includes a plurality session routing engines (SREs) for routing messages in the communication network:
receiving, from a message source identified by a calling party identifier, a first message associated with a call;
identifying a source network, wherein the source network is identified based on information, other than the calling party identifier, that identifies a network providing SoIP services to the message source;
identifying a calling plan applicable to the source network, wherein the calling plan specifies routing requirements applicable to the message source;
selecting an SRE from the plurality of SREs where the selection is based on the calling plan for the source network, and
sending a second message to the selected SRE for routing, the second message including the source network, wherein the selected SRE routes messages associated with the call based on the calling plan routing requirements associated with the source network.

\* \* \* \* \*